Inventors.
WILLIAM J. WILLIAMS.
&
JAMES W. E. HANES.
BY: *William E. Hall*
Attorney.

Patented May 5, 1953

2,637,071

UNITED STATES PATENT OFFICE 2,637,071

CORE FOR MOLDS

William J. Williams and James W. E. Hanes, Ventura, Calif., assignors to Ventura Tool Company, Ventura, Calif., a corporation of California Application March 25, 1950, Serial No. 151,923

9 Claims. (Cl. 18—36)

Our invention relates to molding apparatus, and more particularly to a core for a plastic mold in such apparatus.

In the casting or molding of split collars, particularly split protective collars, made of rubber, used in connection with drill pipes operating in well casings, extreme pressure is applied to the liquid or semi-liquid plastic material employed in molding the collar. Metal reinforcing, in the form of bars, bands, straps, or the like are molded into the collars. Because of the high pressure employed in the molding, the reinforcing elements are distorted, twisted, broken, or displaced.

One of the important objects of this invention is to provide a molding apparatus, and particularly a core therefor, which will properly and effectively support and retain in the desired and intended positions the reinforcing, or the elements thereof, during the process of injecting the liquid or semi-liquid plastic material into the mold, or when applying such high pressures thereto.

Another important object of this invention is to provide a molding apparatus in which the reinforcing means, or elements thereof, may be readily placed and retained in the desired position.

An important object also is to provide a molding apparatus of this class from which the molded article may be easily removed, and in which the core may be readily removed from the molded article.

A further important object of this invention is to provide a core, for a molding apparatus of this class, which is very simple and economical of construction, durable, and which will not readily get out of order.

Figure 1:
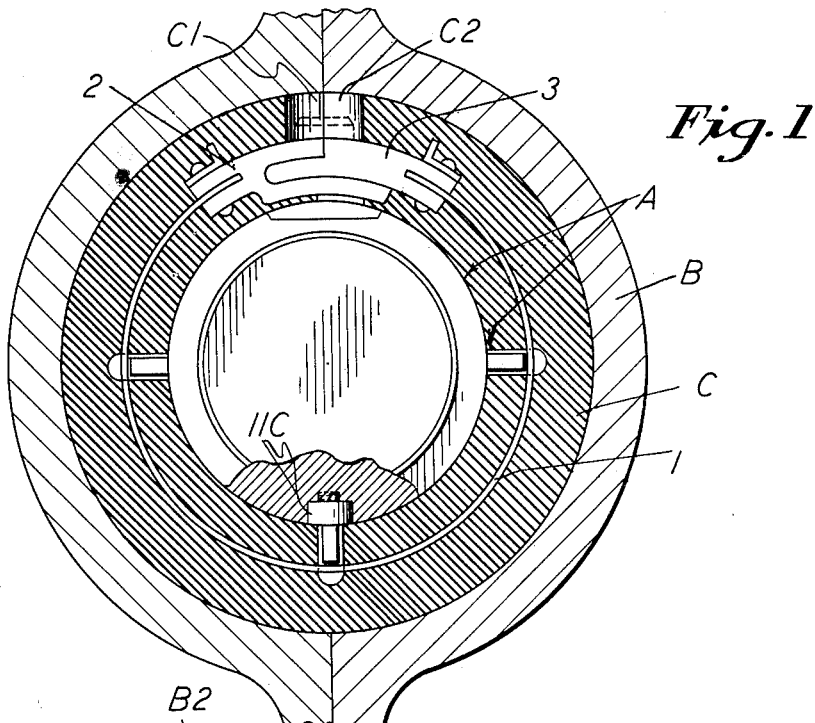
Figure 2:
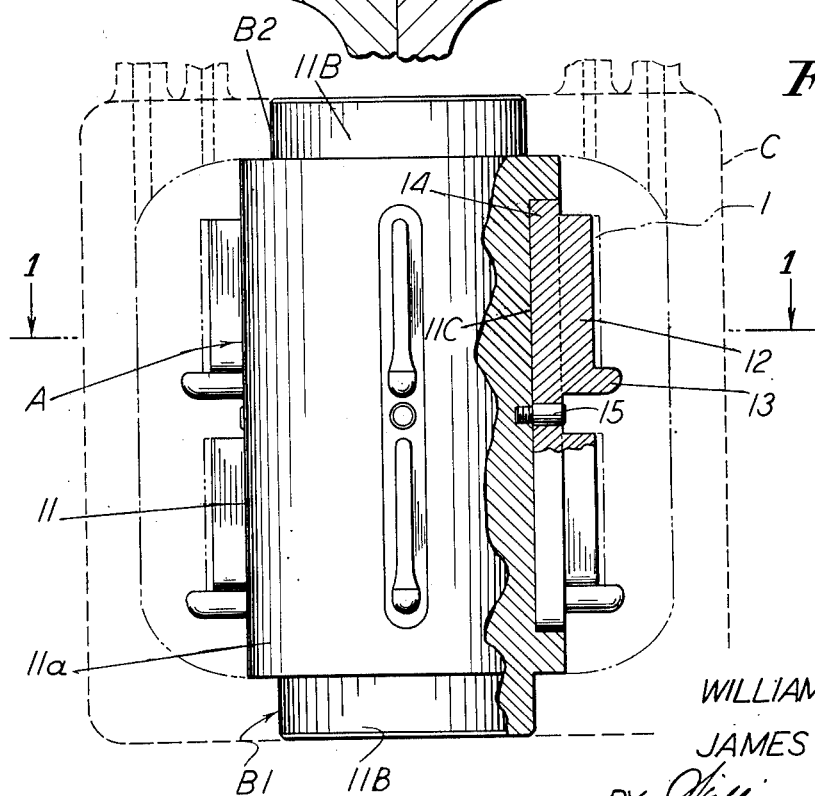

With these and other objects in view, as will appear hereinafter, we have devised a mold core having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a top view of our mold core shown in its normal position within the outer mold member of a molding apparatus, and also showing the article to be molded therein, the molded article and the outer mold member being shown in section, taken on the line 1—1 of Fig. 2, portions of the core being also broken away and in section to facilitate the illustration; and, Fig. 2 is a side elevational view thereof, the article to be molded being shown by dot-and-dash lines and the outer mold member by dotted lines, portions of the core being also broken away and in section to facilitate the illustration.

The core, designated generally by A, is shown located within a hollow outer mold element or member B for casting or molding an article C therein, the article, in this instance, being a split protective collar for drill pipes.

The collar C is cylindrical in shape, split longitudinally at one side. It is molded in this form of very compact rubber. The collar has internal reinforcing, the principal elements of which consist of annular bands 1, two being shown. These bands are located in approximately the middle portion between the inner and outer cylindrical surfaces of the collar, and they extend circumferentially therein between the split portions $C^1$ and $C^2$. They are spaced apart with respect to the axis of the collar. To the ends of the bands are secured band locking members 2 and 3 for securing the split portions of the collar together.

The outer mold element or member B is cylindrical and hollow, and consists of separable parts to facilitate the removal of the collar when molded. The core is cylindrical and is arranged coaxially within the mold member B. The main portion $11^a$ of the member 11 of the core A is cylindrical and forms the cylindrical bore of the collar. The member 11 has coaxial cylindrical ends $11^b$ of reduced diameter, these ends extending into cylindrical openings in heads $B^1$ and $B^2$ at the opposite, or lower and upper portions of the outer mold member, thereby fixedly locating the core A within the outer mold member B of the apparatus.

The core has a multiplicity of reinforcing band carriers, three equi-circumferentially spaced carriers being provided for each band. These carriers consist of spacers 12 and supporting ledge members 13. The spacers are bars of a length substantially equal to the lower width of the bands 1, and extend longitudinally with respect to the longitudinal axis of the core. The supporting ledge members 13 are provided at the lower ends of the bars and extend beyond the outer sides thereof. These ledge members provide shelves for directly supporting or carrying not only the weight of the bands but also the thrust applied on the bands when the semi-liquid or viscous rubber, of which the collar is made, is subjected to the tremendous pressure of approximately 2500 lbs. or more per square inch.

It will be here noted that other means, not shown, are provided for supporting and locating the free or split ends of the bands and the locking members secured thereto. The spacers 12 and supporting ledge members 13 are spaced equi-circumferentially around the portion of the bands between the split portions thereof.

Two units, each consisting of a spacer and a ledge member, are carried in superposed relation, on a long plate-shaped shoe 14. The shoe fits removably into a long recess 11c in the outer surface of the large diameter portion 11a of the core member. The recess for each shoe, there being three, extends longitudinally with respect to the longitudinal axis of the core member. The shoe is slightly wider than the spacer 12 and ledge member 13, and, when located in its recess, is substantially flush with the exterior surface of the core member 11.

Within and intermediate the ends of each recess is located a pilot member 15 to facilitate the location and retention of the shoe in its recess.

When the parts of the outer mold member are separated, the collar may be removed with the core. When the collar is circumferentially separated at the split portion, the spacers 12 and ledge members 13, and the shoes on which they are mounted, are withdrawn from the core member 11. This permits the core member to be withdrawn. The spacers and ledge members are then withdrawn, by means of the shoes, from the bore of the molded collar.

We wish it to be understood that we do not desire to be limited to the exact details of construction shown and described, for obvious modifications will occur to a person skilled in the art.

We claim:

1. In apparatus for molding articles containing an annular member: a hollow mold member; a core member within said mold member; a plurality of circumferentially separated spacers extending outwardly from said core member; and ledge members extending outwardly from said spacers and upon which an end of the annular member can rest in a manner detached from said ledge members; said ledge members and spacers being adapted to support and locate the annular member in spaced relation to the exterior of said core member and the inner wall of said mold member, said spacers having outwardly disposed faces engageable by the inner surface of the annular member to prevent inward movement of the annular member laterally of the axis of the core member and to allow withdrawal of the annular member from the spacers and ledge members.

2. In apparatus for molding articles containing a plurality of longitudinally spaced annular members: a hollow mold member; a core member within said mold member; a plurality of circumferentially separated spacers extending outwardly from said core member and terminating inwardly of said mold member; and longitudinally spaced ledge members extending outwardly from said spacers and upon which the ends of the annular members can rest in a manner detached from said ledge members; said longitudinally spaced ledge members being adapted to support the annular members in longitudinally spaced relation to each other, said spacers being adapted to locate the annular members in lateral spaced relation to the exterior of said core member and the inner wall of said mold member, said spacers having outwardly disposed faces engageable by the inner surfaces of the annular members to prevent inward movement of the annular members laterally of the axis of the core member and to allow withdrawal of the annular members from the spacers and ledge members.

3. In apparatus for molding articles containing an annular member: a hollow mold member; a core member within said mold member having end portions within said mold member; a plurality of longitudinally extending and circumferentially separated elongate spacers extending outwardly from said core member and terminating inwardly from said end portions and said mold member; and ledge members extending outwardly from said spacers and upon which an end of the annular member can rest in a manner detached from said ledge members; said ledge members and spacers being adapted to support and locate the annular member in spaced relation to the exterior and end portions of said core member and in spaced relation to said mold member, said spacers having outwardly disposed faces engageable by the inner surface of the annular member to prevent inward movement of the annular member laterally of the axis of the core member and to allow withdrawal of the annular member from the spacers and ledge members.

4. In apparatus for molding articles containing a plurality of longitudinally spaced annular members; a hollow mold member; a core member within said mold member having end portions within said mold member; a plurality of longitudinally extending and circumferentially separated elongate spacers extending outwardly from said core member and terminating inwardly from said end portions and said mold member; and longitudinally spaced ledge members extending outwardly from said spacers and upon which the ends of the annular members can rest in a manner detached from said ledge members; said longitudinally spaced ledge members being adapted to support the annular members in longitudinally spaced relation to each other and to said end portions, said spacers being adapted to locate the annular members in lateral spaced relation to the exterior of said core member and the inner wall of said mold member, said spacers having outwardly disposed faces engageable by the inner surfaces of the annular members to prevent inward movement of the annular members laterally of the axis of the core member and to allow withdrawal of the annular members from the spacers and ledge members.

5. In apparatus for molding articles containing an annular member: a hollow mold member; a core member within said mold member; a plurality of circumferentially separated spacers detachably secured to and extending outwardly from said core member; and ledge members attached to said spacers and extending outwardly from said spacers and upon which an end of the annular member can rest in a manner detached from said ledge member; said ledge members and spacers being adapted to support and locate the annular member in spaced relation to the exterior of said core member and the inner wall of said mold member, said spacers having outwardly disposed faces engageable by the inner surface of the annular member to prevent inward movement of the annular member laterally of the axis of the core member and to allow withdrawal of the annular member from the spacers and ledge members.

6. In apparatus for molding articles containing a plurality of longitudinally spaced annular members: a hollow mold member; a core member within said mold member; a plurality of circumferentially separated spacers detachably secured to and extending outwardly from said core member and terminating inwardly of said mold member; and longitudinally spaced ledge members secured to and extending outwardly from said spacers and upon which the ends of the annular members can rest in a manner detached from said ledge members; said longitudinally spaced ledge members being adapted to support the annular members in longitudinal spaced relation to each other, said spacers being adapted to locate the annular members in lateral spaced relation to the exterior of said core member and the inner wall of said mold member, said spacers having outwardly disposed faces engageable by the inner surfaces of the annular members to prevent inward movement of the annular members laterally of the axis of the core member and to allow withdrawal of the annular members from the spacers and ledge members.

7. In apparatus for molding articles containing an annular member: a hollow mold member; a core member within said mold member having longitudinally extending recesses circumferentially spaced from one another; a plurality of circumferentially separated elongate spacers disposed within said recesses and engaging the core member at the ends of said recesses and extending laterally outward from said core member; means detachably securing said spacers to said core member; and ledge members attached to and extending laterally outward from said spacers and upon which an end of the annular member can rest in a manner detached from said ledge member; said ledge members and spacers being adapted to support and locate the annular member in spaced relation to the exterior of said core member and the inner wall of said mold member, said spacers having outwardly disposed faces engageable by the inner surface of the annular member to prevent inward movement of the annular member laterally of the axis of the core member and to allow withdrawal of the annular member from the spacers and ledge members.

8. In apparatus for molding articles containing a plurality of longitudinally spaced annular members: a hollow mold member; a core member within said mold member and having a plurality of longitudinally extending and circumferentially spaced recesses therein; a plurality of circumferentially separated spacers disposed within said recesses and engaging the core member at the ends of said recesses and extending laterally outward from the exterior of said core member and terminating inwardly of said mold member; means securing said spacers to said mold member; and longituinally spaced ledge members attached to and extending laterally outward from said spacers and upon which the ends of the annular members can rest in a manner detached from said ledge members; said longitudinally spaced ledge members being adapted to support the annular members in longitudinal spaced relation to each other, said spacers being adapted to locate the annular members in lateral spaced relation to the exterior of said core member and the inner wall of said mold member, said spacers having outwardly disposed faces engageable by the inner surfaces of the annular members to prevent inward movement of the annular members laterally of the axis of the core member and to allow withdrawal of the annular members from the spacers and ledge members.

9. In apparatus for molding articles containing an annular member: a hollow mold member; a core member within said mold member having end portions within said mold member; said core member having external longitudinally extending and circumferentially spaced recesses therein; a plurality of longitudinally extending and circumferentially separated elongate spacers disposed in said recesses and engaging the core member at the ends of said recesses and extending laterally outward from said core member and terminating inwardly from said end portions and said mold member; means detachably securing said spacers to said core member; and ledge members attached to and extending laterally outward from said spacers and upon which an end of the annular member can rest in a manner detached from said ledge member; said ledge members and spacers being adapted to support and locate the annular member in spaced relation to the exterior and the end portions of said core member and in spaced relation to said mold member, said spacers having outwardly disposed faces engageable by the inner surface of the annular member to prevent inward movement of the annular member laterally of the axis of the core member and to allow withdrawal of the annular member from the spacers and ledge members.

WILLIAM J. WILLIAMS.
JAMES W. E. HANES.

References Cited in the file of this patent

UNITED STATES PATENTS

| Number | Name | Date |
|---|---|---|
| 621,270 | McCormick | Mar. 14, 1899 |
| 1,284,362 | Kempton | Nov. 12, 1918 |
| 1,871,586 | Cobb | Aug. 16, 1932 |
| 2,107,009 | Mahle | Feb. 1, 1938 |
| 2,479,557 | Chanowitz | Aug. 23, 1949 |